(12) United States Patent
Yerli

(10) Patent No.: US 9,473,810 B2
(45) Date of Patent: Oct. 18, 2016

(54) SYSTEM AND METHOD FOR ENHANCING LIVE PERFORMANCES WITH DIGITAL CONTENT

(71) Applicant: Calay Venture S.à r.l., Bettembourg (LU)

(72) Inventor: Cevat Yerli, Frankfurt am Main (DE)

(73) Assignee: Calay Venture S.á r.l., Bettembourg (LU)

( * ) Notice: Subject to any disclaimer, the term of this patent is extended or adjusted under 35 U.S.C. 154(b) by 0 days.

(21) Appl. No.: 14/635,696

(22) Filed: Mar. 2, 2015

(65) Prior Publication Data

US 2016/0261902 A1 Sep. 8, 2016

(51) Int. Cl.
| | | |
|---|---|---|
| H04N 7/173 | (2011.01) | |
| H04N 21/4223 | (2011.01) | |
| H04N 21/41 | (2011.01) | |
| H04N 21/2662 | (2011.01) | |
| H04N 21/437 | (2011.01) | |
| H04N 21/475 | (2011.01) | |
| H04N 21/462 | (2011.01) | |
| H04N 21/2187 | (2011.01) | |

(52) U.S. Cl.
CPC ...... *H04N 21/4223* (2013.01); *H04N 21/2187* (2013.01); *H04N 21/2662* (2013.01); *H04N 21/4126* (2013.01); *H04N 21/437* (2013.01); *H04N 21/4621* (2013.01); *H04N 21/4755* (2013.01)

(58) Field of Classification Search
USPC ............................................. 725/13, 46, 133
See application file for complete search history.

(56) References Cited

U.S. PATENT DOCUMENTS

| 7,334,249 B1* | 2/2008 | Byers ..................... H04N 7/165 348/E7.063 |
| 2001/0023436 A1* | 9/2001 | Srinivasan ............ G06T 7/2033 709/219 |
| 2014/0215535 A1* | 7/2014 | Elliott ................ H04N 21/2387 725/81 |

\* cited by examiner

*Primary Examiner* — Hunter B Lonsberry
(74) *Attorney, Agent, or Firm* — Christensen O'Connor Johnson Kindness PLLC

(57) ABSTRACT

Enhancing a live performance of one or more actors with digital content by tracking a movement of the one or more actors and augmenting the live performance with the digital content based on the tracked movement in real time is described.

16 Claims, 2 Drawing Sheets

SYSTEM AND METHOD FOR ENHANCING LIVE PERFORMANCES WITH DIGITAL CONTENT

TECHNICAL FIELD

The present disclosure is directed at systems and methods for enhancing live performances of one or more actors with digital content. More particularly, the present disclosure is directed at systems and methods for enhancing live performances of one or more actors with digital content based on motion tracking of the one or more actors.

BACKGROUND

Common live performances such as live theatre performances do not provide for any form of real-time digital enhancement of the live performance or any interactive audience participation in the live performance.

For example, while common live performances may be enriched with visual and audio effects, the enrichment is typically controlled by staff of the live performance keeping the occurrence of visual and audio effects synchronous to the actions performed during the live performance. Alternatively, the timeline of visual and audio effects may be predefined, in which case the actors have to take care to act synchronously to the predefined timeline in which the visual and audio effects occur. However, in both cases, achieving perfect synchronization is difficult and it is thus challenging to seamlessly integrate complex digital enhancements into a live performance.

Furthermore, interactive audience participation in common live performances is challenging, as massive crowds may produce an overwhelming input that cannot be reasonably coped with by the staff of a live performance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The potential of real-time digital enhancements and interactive audience participation seem to be vast and there hence exists a need to address these issues.

According to the present disclosure, issues in common live performances are addressed by a system for enhancing a live performance of one or more actors with digital content and a method for enhancing a live performance of one or more actors with digital content.

According to a first aspect, the system for enhancing a live performance of one or more actors with digital content comprises a performance capturing device and a rendering engine. The performance capturing device is configured to track a movement of the one or more actors and to stream signals which are generated based on the movement of the one or more actors to the rendering engine. The rendering engine is configured to augment the live performance in real time with digital content based on the signals from the performance capturing device.

Thus, one or more actors may undertake their performance in a usual way, for example by adhering to a predefined plot, while the movement of the one or more actors is tracked and transmitted to the rendering engine by the performance capturing device. The rendering engine is configured to translate the tracked movement, which may be the transmitted motion capture signal, to a wide range of digital content for display and/or audition to the live performance audience, thereby augmenting the live performance and enhancing the live performance audience's viewing and/or listening experience.

Hence, what the live performance audience will see and/or hear will depend on what the one or more actors do and in particular how they do it, such as based on the actors' decisions, their strategy and skills, etc., as expressed by their movements which are in turn translated by the rendering engine into the desired digital content, enhance the live performance for the enjoyment of the live performance audience.

Preferably, the system further comprises one or more of a projector, a laser, a display screen, an audio/sound system and holographic technology which receives digital content from the rendering engine in any combination.

Thus, the enhancement of the live performance audience's experience may include a wide variety of visual and acoustic effects that complement the live performance. In particular, the visual effects may be such that they do not only complement the performance of the one or more actors but become an integral part of the performance, for example by providing the impression that the one or more actors interact with a visual appearance on a display screen or a visual appearance generated by a laser or holographic technology on the stage.

Preferably, the performance capturing device comprises a camera motion tracking module which is configured to track the movement of the one or more actors.

A camera motion tracking module makes it possible to provide real-time motion capture technology which places only humble restrictions on the tracked motion and thus allows the usage of the system in a wide variety of live performance environments, into which the camera motion tracking module can be seamlessly integrated.

Preferably, the camera motion tracking module is integrated into a live stage system.

As used throughout the description and claims, the term "live stage system" is intended to refer to a lighting and/or audio/sound system installed on racks on or in the vicinity of the stage. Integrating the camera motion tracking module into the live stage system further adds to seamlessly merging the performance capturing device into live performance environments. For example, the camera may be attached to a light rig on the live performance stage, which can be a simple installation process.

Preferably, the performance capturing device streams the signals to the rendering engine over a wireless link.

Having a wireless connection such as an IEEE 802.11 or IEEE 802.16 connection between the performance capturing device and the rendering engine gives a great amount of freedom for placing the performance capturing device and the rendering engine in the live performance environment and also reduces system installation efforts. Yet, the present disclosure is not restricted to a particular wireless technology and any other technology or protocol for wireless transmission of data can be used.

Preferably, the rendering engine is configured to receive input from a plurality of handheld devices and to augment the live performance with digital content based on the signals from the performance capturing device and the input from the plurality of handheld devices.

Thus, the live audience experience can also be further enhanced by the addition of audience interactive handheld devices, for example smartphones, tablets, game controllers, or other similar devices. The handheld devices give the live audience the ability to influence the live performance by their actions as expressed via the input to the rendering engine from the plurality of handheld devices.

Preferably, the rendering engine is configured to receive the signals from the plurality of handheld devices over a wireless link.

Having a wireless link such as a cellular network, an IEEE 802.11 connection, or an IEEE 802.16 connection facilitates participation in the interaction and also allows for great freedom in placing the rendering engine relative to the live audience. Preferably, the rendering engine is configured to receive signals indicating audience demographic and profile data and to augment the live performance with digital content based on the signals from the performance capturing device and the signals indicating audience demographic and profile data.

Thus, the rendering engine may be configured to initiate a vast array of digital content/output for display to the live performance audience, wherein the exact nature of the digital content displayed and/or auditioned to the live performance audience depends on the particular scene or moment in the live performance, the demographic of the audience, and the type of live performance and the effects desired by the live performance's producer.

According to another aspect, the method for enhancing a live performance of one or more actors with digital content comprises tracking a movement of the one or more actors, streaming signals that are generated based on the movement of the one or more actors to a rendering engine, and augmenting the live performance with digital content in real time, based on the signals.

Thus, the performance capturing technology streams the one or more actors' performances to the rendering engine which is configured to use the one or more actors' movements as input signals to initiate, create, render and thus enhance and augment a live performance with real-time digital content. As stated above, the digital content may be displayed/auditioned to the live performance audience in real time through suitable projectors, lasers, display screens, audio/sound systems and/or holographic technology.

Preferably, the rendering engine receives pre-rendered digital content and/or predetermined visual effects and generates the signals based on the movement of the one or more actors and at least a part of the pre-rendered digital content and/or at least a part of the predetermined visual effects.

Thus, the rendering engine also allows for pre-rendered digital content and/or predetermined visual effects to be displayed and/or auditioned to the live performance audience and for subsequent digital content to be determined by what the one or more actors do over the coming scenes.

Preferably, the method further comprises receiving, by the rendering engine, audience demographic and profile data and selecting the at least a part of the received pre-rendered digital content and/or the at least a part of the predetermined visual effects on the basis of the received audience demographic and profile data.

Thus, the received pre-rendered digital content and/or predetermined visual effects displayed and/or auditioned to the live performance audience is selected on the basis of the received audience demographic and profile data and can thus be adapted to the audience in view of the artistic concept of the live performance's producer. For example, the live performance's producer may have provided for different pre-rendered digital content and/or predetermined visual effects for different audience demographics and the respective pre-rendered digital content and/or predetermined visual effects may be selected by the rendering engine in accordance with an actual audience demographic, for example, a mean age, a predetermined age range, a gender distribution, etc. of the live performance audience.

Preferably, the rendering engine is implemented on a real-time render server. The render server may control one or more of a projector, a laser, a display screen, an audio/sound system, and/or holographic technology in any combination.

The real-time render server may thus comprise sufficient hardware resources to perform rendering of the digital content in real time. Furthermore, the display screens and the projectors may be used to display the digital content to enhance the live performance on stage but may also be used to display the live performance augmented and thus enhanced with the digital content.

Preferably, the render server transmits output data to a plurality of handheld devices of the audience.

Thus, the audience of the live performance can publish live stage pictures, videos, and other content via the handheld devices to social media platforms. Furthermore, the audience may also invite friends or acquaintances to participate in enhancing the live performance by providing an indication of how to connect and submit input to the rendering engine.

Preferably, the rendering engine receives input from a plurality of handheld devices of the audience and generates the signals based on the movement of the one or more actors and the input from the handheld devices of the audience.

Thus, the method allows for audience interaction and influence via handheld devices, e.g., smartphones, tablet computers, game controllers, or other similar devices. The handheld devices may be connected to the render server through a wireless connection and give the live performance audience the ability to influence the digital enhancement and augmentation of the live performance. For example, the audience's actions may be used or interpreted by the rendering engine to create the digital content.

Preferably, the method further comprises transmitting the enhanced live performance to a social platform.

Transmitting the enhanced live performance to a social platform allows making a variety of different people aware of the live performance and gives the possibility to connect to the render server using a social platform account which may also be used to determine audience demographic and profile data.

Furthermore, the rendering engine may also allow the one or more actors to initiate special effects through their movements. The potential for and the precise nature of any special effects is vast, and while these special effects may be real-time, digitally created and visual or audio effects, they are not limited to this format and could, for example, be real world physical effects triggered by the one or more actors, for example by gestures, touching an element in the digital content enhanced live performance environment or by pressing a physical trigger in communication with the rendering engine.

Moreover, a physical lighting system such as a light rig may also be set up on the stage of the live performance environment. For example, the physical light rig may be controlled by a physically-based lighting component in the rendering engine. The power of the Illuminating Engineering Society (IES)-profile compliant and physically-based lighting component inside the rendering engine may thus enable live action lighting to seamlessly drive virtual lighting, thus providing a unique lighting experience. (An IES profile provides a computer-readable description of a distribution of a light intensity of a physical light element, such as a spotlight.)

According to another aspect of the present disclosure, a computer-readable medium having instructions stored thereon is provided, such as one or more non-transitory computer-readable media, wherein said instructions, in response to execution by a computing device, cause said computing device to automatically perform a method for enhancing a live performance of one or more actors with digital content according to one or more embodiments of the present disclosure. In particular, the instructions may cause the computing device to automatically track a movement of the one or more actors, stream signals which are generated based on the movement of the one or more actors to a rendering engine, and augment the live performance with digital content in real time, based on the signals.

Hence, the foregoing summary discloses a system and a method that uses a (real-time) rendering engine to enhance the audience experience of live performances with real-time digital content/output, in particular by augmented reality technology and/or holographic technology. The digital content/output is for example displayed through a series of projectors, lasers, augmented reality screens, and audio/sound output devices in any combination. The live performance audience's experience may be further enhanced through an interactive element, which is effected through handheld interactive devices that are connected to the rendering engine, which enables the addition of further digital augmentation to the live performance.

BRIEF DESCRIPTION OF THE DRAWINGS

Further advantages and features will become apparent from the following description, with reference to the accompanying drawings, in which.

DETAILED DESCRIPTION

Figure 1:
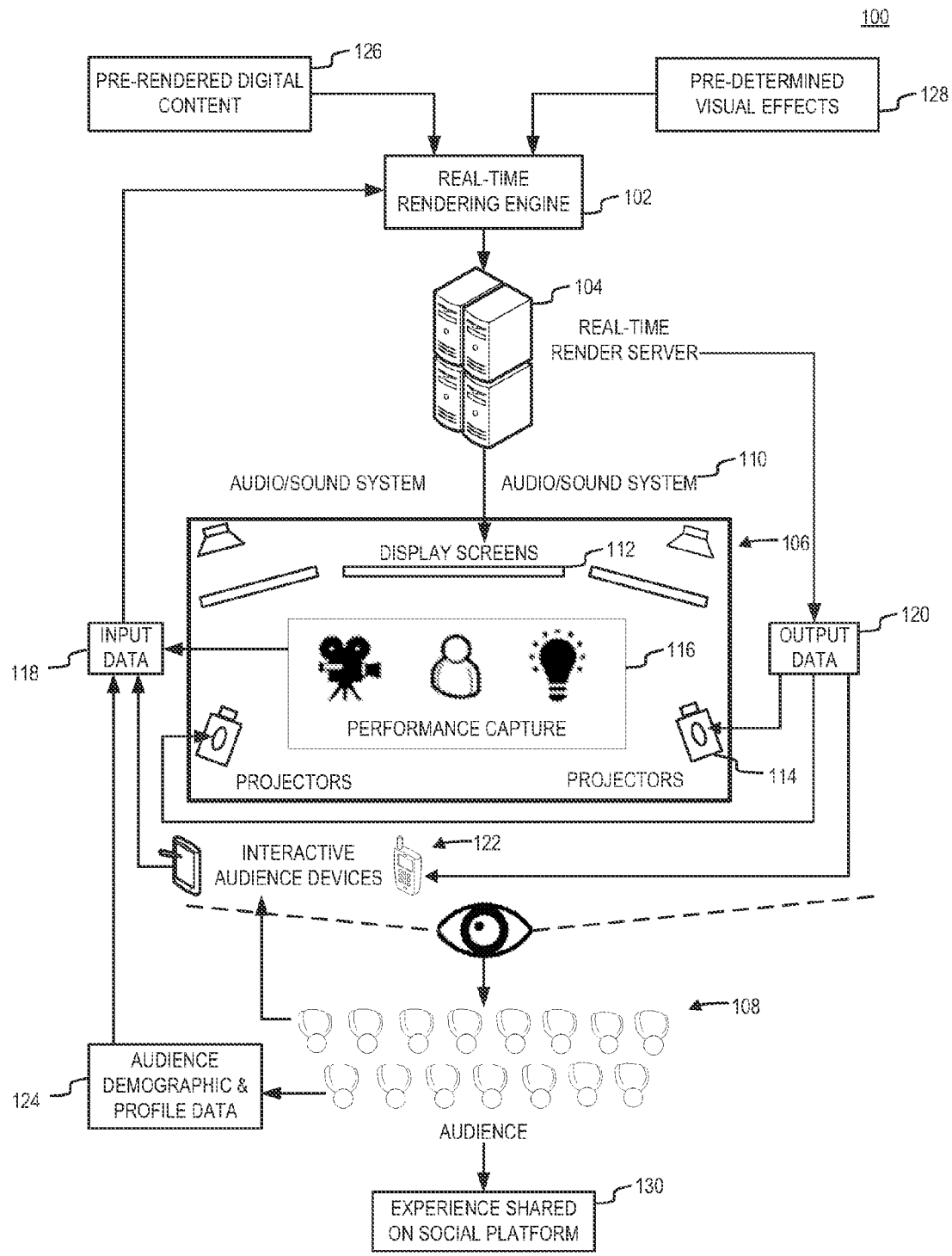
FIG. 1 is a schematic view of an exemplary live performance environment.

Reference will now be made to an implementation example illustrated in the drawings and specific language will be used to describe the same. It will, nevertheless, be understood that no limitation of the scope of the invention is thereby intended, such alterations and further modifications in the illustrated system and such further applications of the principles of the disclosure as illustrated therein being contemplated as would normally occur now or in the future to one skilled in the art to which the disclosure relates.

FIG. 1 is a schematic view of an exemplary live performance environment 100. The live performance environment 100 comprises a real-time rendering engine 102, which is implemented on a real-time render server 104. Alternatively, the real-time rendering engine 102 may be implemented on a real-time rendering engine device and the real-time rendering engine device may be connected to the real-time render server 104.

The live performance environment 100 further comprises a stage as part of a stage environment 106 and a live performance audience 108. The stage environment 106 further comprises an audio/sound system 110 and display screens 112 which receive digital content from the real-time render server 104. Furthermore, the stage environment 106 comprises projectors 114 which receive digital content in the form of output data 120 from the real-time render server 104 via a wireless link.

The stage environment 106 further comprises a performance capturing device 116 having a camera motion tracking module that tracks the movements of one or more actors acting as part of the live performance. Optionally, the camera motion tracking module also tracks the lighting conditions in the stage environment 106. The performance capturing device 116 transmits signals relating to the movements of one or more actors and optionally also signals relating to the lighting conditions and/or to a video stream of the live performance as input data 118 to the real-time rendering engine 102.

The real-time rendering engine 102 in turn produces digital content on basis of the input data 118, wherein the digital content is to be displayed and/or auditioned to the live performance audience 108 to augment and thus enhance the live performance in the stage environment 106 and/or to augment and thus enhance the video stream of the live performance if provided by the performance capturing device 116.

To augment and thus enhance the live performance in the stage environment 106, the real-time render server 104 may transmit digital content to the audio/sound system 110 and the display screens 112. In addition, the real-time render server 104 may transmit digital content in form of output data 120 to the projectors 114. Moreover, digital content may also be displayed and/or auditioned to the live performance audience 108 by transmitting the output data 120 of the real-time render server 104 including the enhanced video stream of the live performance to a plurality of interactive audience devices 122, e.g., handheld devices like mobile phones or tablet computers.

The interactive audience devices 122 may also be used to supplement or modify the input data 118 which is transmitted to the real-time rendering engine 102, thereby allowing the live performance audience 108 to participate in the live performance by affecting the generation of the digital content which is displayed and/or auditioned to the live performance audience 108. A further factor that may affect the generation of the digital content is audience demographic and profile data 124 classifying the live performance audience 108 which can be used to further supplement or modify the input data 118 transmitted to the real-time rendering engine 102, thereby allowing to tailor the digital content in view of a specific live performance audience 108.

The real-time rendering engine 102 may further be provided with pre-rendered digital content 126 and/or predetermined visual effects 128. For example, the pre-rendered digital content 126 and/or predetermined visual effects 128 may be displayed and/or auditioned at certain points in the timeline of the live performance while the digital content created from the input data 118 may be used to complement or continue the pre-rendered digital content 126 and/or predetermined visual effects 128.

According to a further aspect, the experience may be shared 130 by the live performance audience 108 on a social platform. For example, the output data 120, e.g., a video of the enhanced live performance may be streamed to friends or acquaintances of the live performance audience 108 on a social platform.

Figure 2:
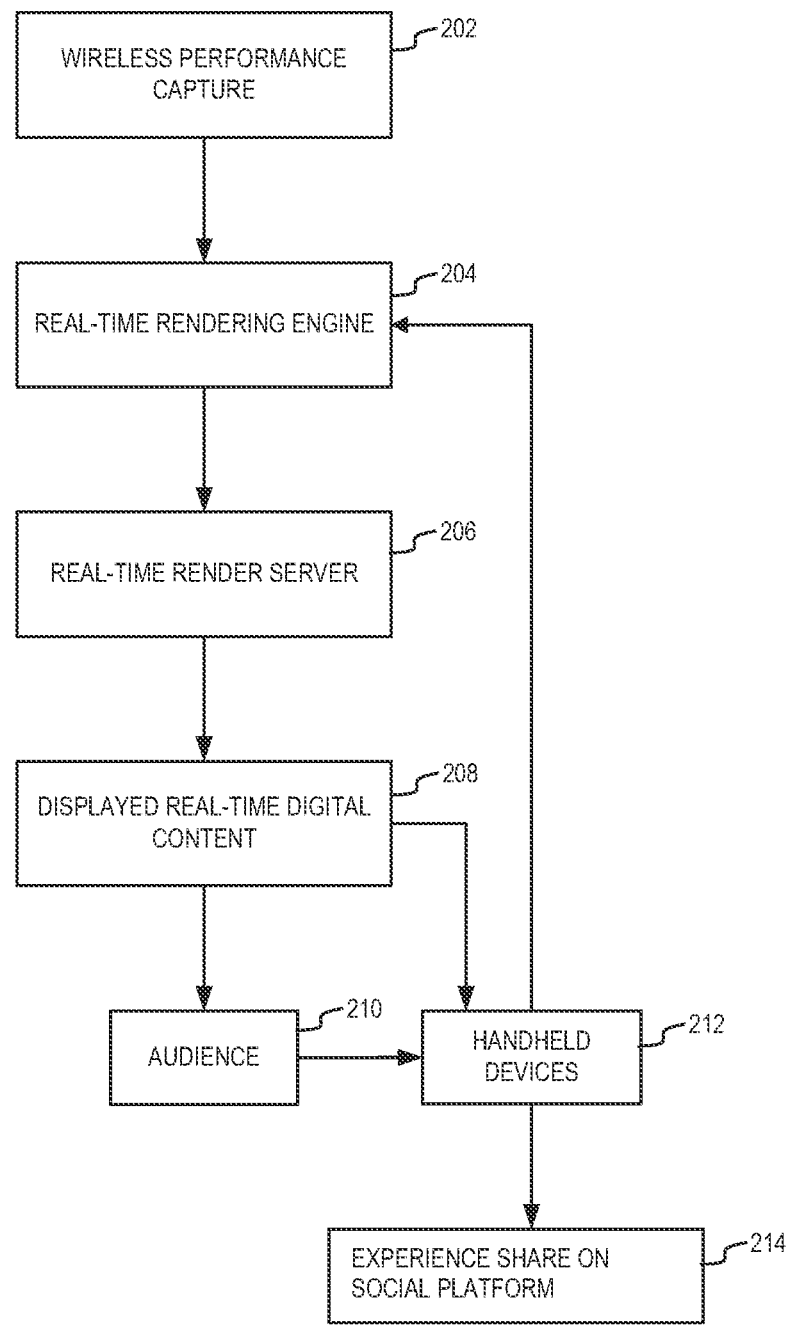
FIG. 2 is a flow diagram showing operations performed in the live performance environment.

FIG. 2 is a flow diagram 200 showing operations performed in the live performance environment 100. At 202, the performance is wirelessly captured by the performance capturing device 116. At 204, the captured performance is streamed to the real-time rendering engine 102. For example, the captured performance is streamed to the real-time rendering engine 102 using a wireless link such as IEEE 802.11 or IEEE 802.16.

At 206, the real-time render server 104 is caused by the real-time rendering engine to generate digital content based on the captured performance. At 208, the real-time digital content is displayed to the live performance audience 108 and streamed together with at least a part of the captured performance to the handheld interactive audience devices 122. Optionally, at 210, the live performance audience 108 may also capture the live performance experience with handheld devices.

The handheld interactive audience devices 122 may in turn be used at 212 to provide input data 118 to the real-time rendering engine 204. Furthermore the handheld interactive audience devices 122 may also be used at 212 to provide the real-time digital content and/or the live performance experience to a social platform. At 214, the real-time digital content and/or the live performance experience may be shared with other users on the social platform.

To further promote an understanding of further aspects of the live performance environment 100, reference will now be made to two exemplary use cases.

According to a first use case, a scene of a live performance performed in the stage environment 106 may comprise a live actor and a digitally created dragon based on a smoke-based holographic effect, i.e., a combination of digitally created content and real world special effects. In the performance, the actor fights the dragon and the wireless motion captured movements of the actor are transmitted to the real-time rendering engine 102.

The real-time rendering engine 102 translates the actor's fighting movements into new real-time digital content, e.g., characters or avatars, etc., that in turn react to the actor's movements and actions. The performance capturing device 116 shoots the live action on the stage environment 106 and the real-time rendering engine 102 combines the video footage via an HD-SDI video feed with the generated digital content. The display screens 112 present the final augmented reality scene to the live performance audience.

According to a second use case, a level in a video game is displayed to a live performance audience 108 and an actor in the stage environment 106. The actor reacts to what he/she sees and plays out the game level "live" in front of the live performance audience 108. The digital content that is displayed is determined by the video game and is directly related to the actors skill level, the strategy used, the decisions made, etc. The live performance audience 108 can participate through their handheld interactive audience devices 122 in the live performance, and their own reactions, decisions, etc., can be interpreted by the real-time rendering engine 102, which, for example, enables them to compete against the live actor.

The live performance audience 108 may capture the live performance in the stage environment 106 or the output data 120 and then share the captured content with their friends via social platforms. An app on the handheld interactive audience devices 122 may even enable the friends via social platforms to provide input that can be incorporated and drive the virtual content rendered by the real-time rendering engine 102.

The example and the use cases described above and the drawings merely serve to illustrate the disclosure and its advantages over the prior art, and should not be understood as a limitation in any sense.

The embodiments of the invention in which an exclusive property or privilege is claimed are defined as follows:

1. A system for enhancing a live performance of one or more actors in a stage environment of a live performance environment with digital content, the system comprising:
 a performance capturing device; and
 a rendering engine;
 wherein the performance capturing device is configured to track a movement of the one or more actors and to stream signals that are generated based on the movement of the one or more actors to the rendering engine; and
 wherein the rendering engine is configured to augment the live performance in the stage environment in real time with digital content based on the signals from the performance capturing device.

2. The system of claim 1, further comprising a projector, a laser, a display screen, an audio/sound system, and/or holographic technology that receives digital content from the rendering engine.

3. The system of claim 1, wherein the performance capturing device comprises a camera motion tracking module that is configured to track the movement of the one or more actors.

4. The system of claim 3, wherein the camera motion tracking module is integrated into a live stage system.

5. The system of claim 1, wherein the performance capturing device streams the signals to the rendering engine over a wireless link.

6. The system of claim 1, wherein the rendering engine is configured to receive input from a plurality of handheld devices and to augment the live performance with digital content based on the signals from the performance capturing device and the input from the plurality of handheld devices.

7. The system of claim 6, wherein the rendering engine is configured to receive the signals from the plurality of handheld devices over a wireless link.

8. The system of claim 1, wherein the rendering engine is configured to receive signals indicating audience demographic and profile data and to augment the live performance with digital content based on the signals from the performance capturing device and the signals indicating audience demographic and profile data.

9. A method for enhancing a live performance of one or more actors in a stage environment of a live performance environment with digital content, the method comprising:
 tracking a movement of the one or more actors;
 streaming signals that are generated based on the movement of the one or more actors to a rendering engine; and
 augmenting the live performance in the stage environment with digital content in real time, based on the signals.

10. The method of claim 9, further comprising receiving, by the rendering engine, pre-rendered digital content and generating the signals based on the movement of the one or more actors and at least a part of the pre-rendered digital content.

11. The method of claim 10, further comprising receiving, by the rendering engine, audience demographic and profile data and selecting the at least a part of the received pre-rendered digital content based on the received audience demographic and profile data.

12. The method of claim 9, wherein the rendering engine is implemented on a real-time render server.

13. The method of claim 12, further comprising controlling, by the render server, at least one of a projector, a laser, a display screen, an audio/sound system, and/or holographic technology.

14. The method of claim 12, further comprising transmitting, by the render server, output data to a plurality of handheld devices of an audience.

15. The method of claim 14, further comprising receiving, by the rendering engine, input from the plurality of handheld devices of the audience and generating the signals based on the movement of the one or more actors and the input from the handheld devices of the audience.

16. The method of claim 9, further comprising transmitting the enhanced live performance to a social platform.

* * * * *